United States Patent
Dewey et al.

(10) Patent No.: US 7,493,462 B2
(45) Date of Patent: Feb. 17, 2009

(54) APPARATUS, SYSTEM, AND METHOD FOR VALIDATING LOGICAL VOLUME CONFIGURATION

(75) Inventors: Douglas William Dewey, Tucson, AZ (US); Earle Ellsworth, Benson, AZ (US)

(73) Assignee: International Business Machines Corporation, Armonk, NY (US)

( * ) Notice: Subject to any disclaimer, the term of this patent is extended or adjusted under 35 U.S.C. 154(b) by 214 days.

(21) Appl. No.: 11/039,420

(22) Filed: Jan. 20, 2005

(65) Prior Publication Data

US 2006/0161754 A1   Jul. 20, 2006

(51) Int. Cl.
*G06F 12/00* (2006.01)
*G06F 13/00* (2006.01)
*G06F 13/28* (2006.01)

(52) U.S. Cl. .............. 711/170; 711/152; 711/163; 711/165

(58) Field of Classification Search .......... 711/170
See application file for complete search history.

(56) References Cited

U.S. PATENT DOCUMENTS

| | | | |
|---|---|---|---|
| 5,890,204 A | 3/1999 | Ofer et al. ............ 711/111 |
| 6,363,462 B1 | 3/2002 | Bergsten ............... 711/162 |
| 6,366,988 B1 | 4/2002 | Skiba et al. ............ 711/162 |
| 6,629,158 B1 | 9/2003 | Brant et al. ............ 710/10 |
| 6,633,962 B1 * | 10/2003 | Burton et al. .......... 711/163 |
| 6,658,528 B2 | 12/2003 | Archibald, Jr. et al. .. 711/112 |
| 2003/0037187 A1 * | 2/2003 | Hinton et al. ........... 710/1 |
| 2003/0140207 A1 | 7/2003 | Nagase et al. ........... 711/167 |
| 2003/0236884 A1 * | 12/2003 | Yamamoto et al. ....... 709/225 |
| 2005/0114595 A1 * | 5/2005 | Karr et al. ............... 711/114 |
| 2005/0172166 A1 * | 8/2005 | Eguchi et al. ........... 714/20 |

OTHER PUBLICATIONS

Tanenbaum, Andrew. Structured Computer Organization. Prentice Hall, Inc. 1984.*

* cited by examiner

*Primary Examiner*—Kevin L Ellis
*Assistant Examiner*—Ryan Bertram
(74) *Attorney, Agent, or Firm*—Kunzler & McKenzie (57) ABSTRACT

An apparatus, system, and method are disclosed for validating logical volume configuration. A determination module makes a determination of a type of a host operating system of a host computer requesting access to a logical volume. A characterization module characterizes the host type of the logical volume. A compatibility module determines if the logical volume is configured for the host operating system. A mitigation module mitigates the mis-configuration if the logical volume is not configured for the host operating system.

19 Claims, 7 Drawing Sheets

| | Metadata Characteristic Field | Partition Characteristic Field | Operating System Field |
|---|---|---|---|
| Host Type Entry 705a | 710a | 715a | 720a |
| Host Type Entry 705b | 710b | 715b | 720b |
| Host Type Entry 705c | 710c | 715c | 720c |

FIG. 7

APPARATUS, SYSTEM, AND METHOD FOR VALIDATING LOGICAL VOLUME CONFIGURATION

BACKGROUND OF THE INVENTION

1. Field of the Invention

This invention relates to validating a proper configuration in computer data repositories and more particularly relates to validating a logical volume configuration.

2. Description of the Related Art

Computers in a computer system often share common resources such as communications channels and storage subsystems. The computers, often referred to as host computers, typically access one or more resources over a network. Multiple host computers may access a resource or the resource may be associated with one or more specific host computers. Each host computer is configured with a host operating system such as Linux, AIX, OS/360 and the like.

Some resources such as storage subsystems may include one or more storage devices. Each storage device may further include one or more logical volumes. Each logical volume may be configured to be compatible with a specified host operating system, and may be incompatible with other operating systems. A host operating system accessing a logical volume not configured for the host operating system may result in failures, errors, or poor performance.

Figure 1:
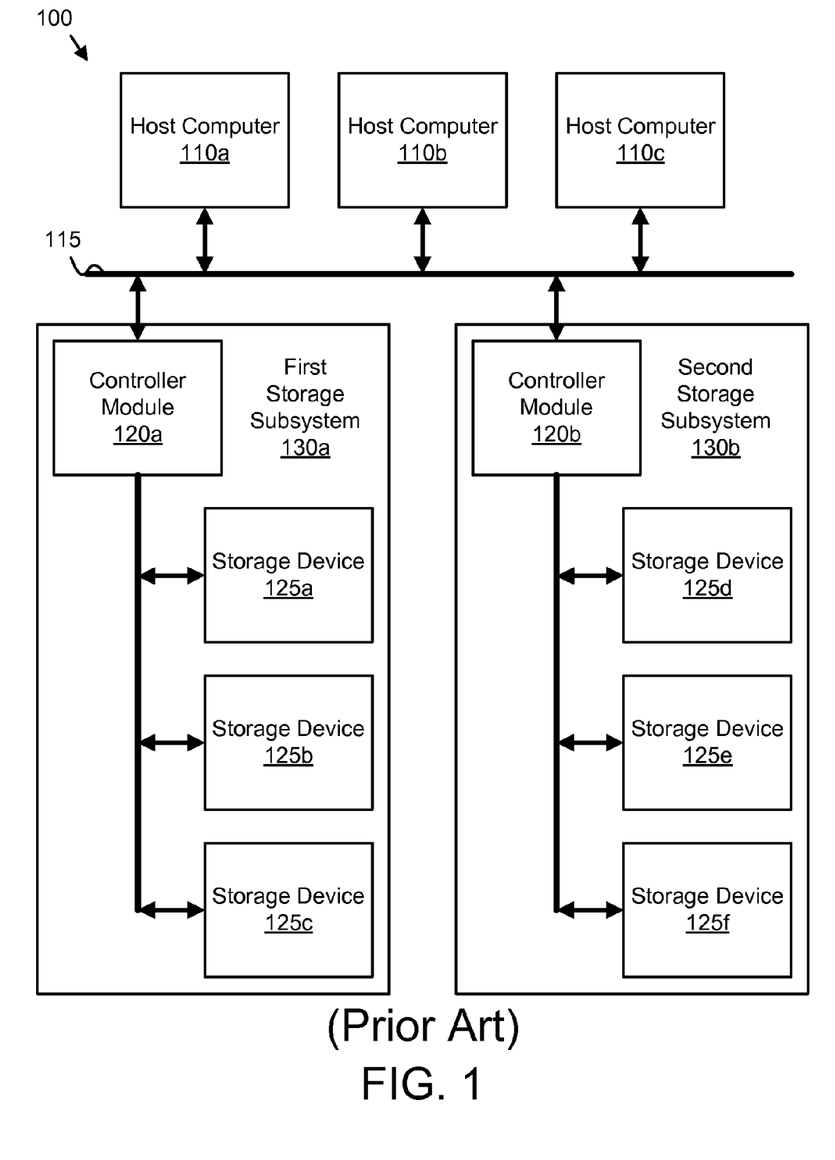
FIG. 1 is a schematic block diagram illustrating one embodiment of a computer system.

FIG. 1 is an illustration of one embodiment of a computer system 100. The system 100 includes one or more host computers 110, a network 115, and one or more storage subsystems 130 each comprising a controller module 120 and one or more storage devices 125. In one embodiment, the system 100 is organized as a storage area network. The storage devices 125 may be magnetic tape drives, hard disk drives, redundant arrays of independent disks ("RAID") arrays, optical drives, and the like. Each storage device 125 includes storage media configured to store data. Each controller module 120 controls and manages one or more storage devices 125. The host computer 110 may access the storage device 125 by communicating requests to the controller module 120 of the storage subsystem 130, causing the controller module 120 to store and retrieve data in response to the requests.

Figure 2:
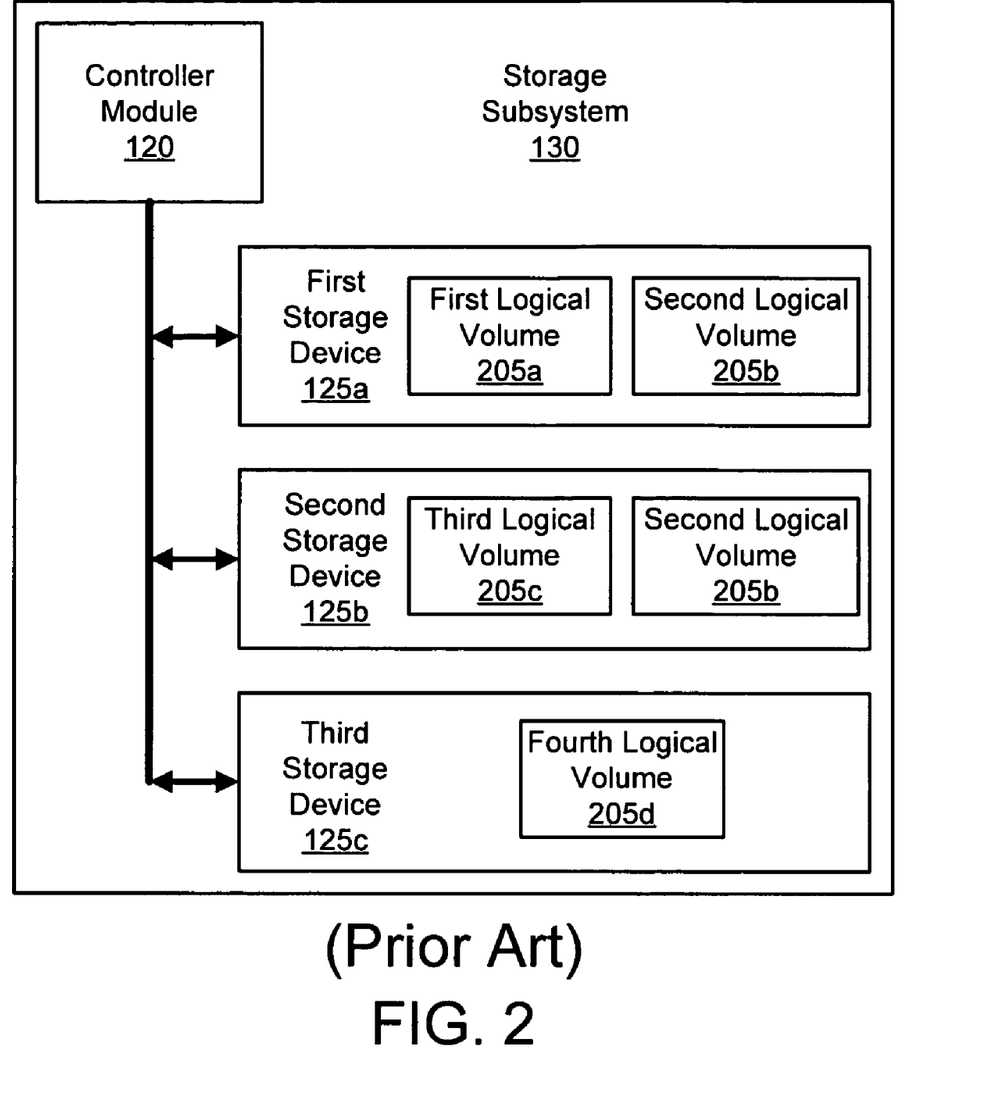
FIG. 2 is a schematic block diagram illustrating one embodiment of a storage subsystem.

FIG. 2 illustrates one embodiment of a storage subsystem 130. Each storage device 125 comprises one or more logical volumes 205 as is well known by those skilled in the art. In one embodiment, a host computer 110 is associated with a logical volume 205 and uses the associated logical volume 205 to store and retrieve data. A storage device 125 such as the first storage device 125a may include a plurality of logical volumes 205 such as the first and second logical volumes 205a, 205b. A logical volume 205 may also reside on one or more storage devices 125. For example, the second logical volume 205b is depicted as residing on the first storage device 125a and the second storage device 125c.

The host computer's 110 operating system or host operating system organizes data on a logical volume 205 using a file structure or similar organizational structure. Different operating systems or different versions of operating systems may have different file structures. Each logical volume 205 is configured to support at least one file structure. In addition, each logical volume 205 may store metadata on the storage media to designate physical and logical divisions of the storage media such as partitions, data blocks, volumes, and the like. The host operating system uses the metadata to organize a file structure on the logical volume 205.

The configuration of the metadata and other partitions on the storage device 125 may be referred to as the logical volume's 205 host type. The logical volume 205 must configured to be compatible with a host operating system's file structure. Yet the host computer 110 typically does not have information about the host type that an operator has configured the storage system 130 to assign to the logical volume 205. In addition, the computer system 100 may include host computers 110 configured with a plurality of host operating system and logical volumes 205 configured to be compatible with a plurality of host operating systems.

Unfortunately, in such a system 100, the storage subsystem 130 may be directed to associate a host computer 110 with an incompatible logical volume 205 such as the first logical volume 205a. The storage subsystem 130 may associate the first incompatible logical volume 205a to the host computer 110 because the storage subsystem 130 cannot determine if the first logical volume's 205a host type and the host operating system are compatible. As a result, data loss or other operational problems may occur.

From the foregoing discussion, it should be apparent that a need exists for an apparatus, system, and method that validate whether a logical volume 205 is configured for a host operating system and that mitigates mis-configuration of the logical volume. Beneficially, such an apparatus, system, and method would prevent the association of host computers 110 to mis-configured logical volumes 205.

SUMMARY OF THE INVENTION

The present invention has been developed in response to the present state of the art, and in particular, in response to the problems and needs in the art that have not yet been fully solved by currently available configuration validation methods. Accordingly, the present invention has been developed to provide an apparatus, system, and method for validating logical volume configuration that overcome many or all of the above-discussed shortcomings in the art.

The apparatus to validate configuration is provided with a logic unit containing a plurality of modules configured to functionally execute the necessary steps of validating and mitigating logical volume configuration. These modules in the described embodiments include a determination module, a characterization module, a compatibility module, and a mitigation module.

The determination module makes an estimation of a type of a host operating system of a host computer. In one embodiment, the determination module receives the type of the host operating system identity from a user. In an alternate embodiment, the determination module queries the host computer for the host operating system information.

The characterization module characterizes the host type of a logical volume. The host type as used herein refers to the configuration of the logical volume including the organization of metadata on the storage media and divisions of the storage media such as partitions. The characterization module preferably characterizes the host type of the logical volume through a read-only examination of the logical volume. In one embodiment, the characterization module characterizes the host type by reading and identifying the characteristic specifications of the metadata contained within the logical volume.

In one embodiment, the apparatus includes a host type record. The host type record is configured with a plurality of host types each associated with at least one host operating system and including one or more host operating system characteristic specifications. The characterization module may identify the host type of the logical volume using the host type record.

The compatibility module determines if the logical volume is configured for the host operating system. In one embodiment, the compatibility module identifies a compatible host operating system for a host type of a logical volume from the host type record. The mitigation module mitigates the mis-configuration if the logical volume is not configured for the host operating system. In one embodiment, the mitigation module notifies a user if the logical volume is not configured for the host operating system.

A system of the present invention is also presented to validate configuration. The system may be embodied in a computer system. In particular, the system, in one embodiment, includes a host computer, a network, and a storage subsystem comprising a controller module and a storage device.

The controller module of the storage subsystem is directed to associate a logical volume of the storage device to the host computer, allowing the host computer to store data to and retrieve data from the logical volume. The controller module estimates a host operating system of the host computer and characterizes the host type of the logical volume. In addition, the controller module determines if the logical volume is configured for the host operating system. The controller module mitigates the mis-configuration if the logical volume is not configured for the host operating system.

A method of the present invention is also presented for validating configuration. The method in the disclosed embodiments substantially includes the steps necessary to carry out the functions presented above with respect to the operation of the described apparatus and system. In one embodiment, the method includes estimating a host operating system, characterizing a host type of a logical volume, determining if the logical volume is configured for the host operating system, and if the logical volume is not configured for the host operating system, mitigating the mis-configuration.

A determination module estimates a host operating system of a host computer and a characterization module characterizes a host type of a logical volume. A compatibility module determines if the logical volume is configured for the host operating system. In addition, the mitigation module mitigates the mis-configuration if the logical volume is not configured for the host operating system.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

The present invention validates that a logical volume is configured for a host operating system. In addition, the present invention mitigates the mis-configuration if the logical volume is not configured for the host operating system. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Figure 3:
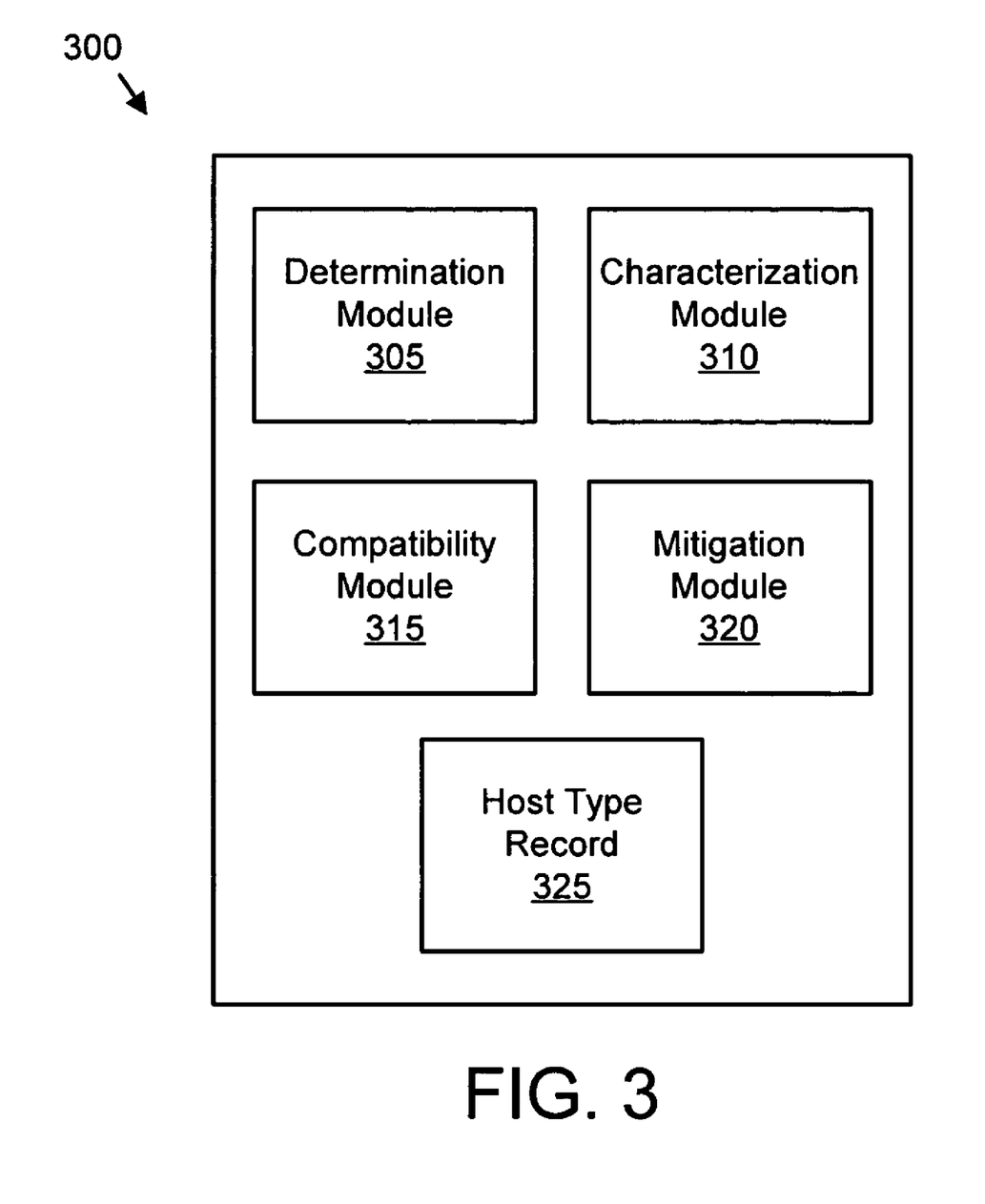
FIG. 3 is a schematic block diagram illustrating one embodiment of a validation apparatus in accordance with the present invention.

FIG. 3 is a schematic block diagram of a validation apparatus 300 in accordance with the present invention. The apparatus 300 includes a determination module 305, a characterization module 310, a compatibility module 315, a mitigation module 320, and a host type record 325. In one embodiment, the apparatus 300 is configured as a controller module 120 such as the controller module 120 depicted in FIGS. 1 and 2. In a certain embodiment, the determination module 305, characterization module 310, compatibility module 315, and mitigation module 320 are software programs executing on the controller module 120. In addition, the host type record 325 may be a data file that is accessed by the controller module 120.

The determination module 305 makes a determination of a type of a host operating system of a host computer 110. In one embodiment, the determination module 305 receives the determination of the host operating system from a user. For example, the user may notify the determination module 305 that the host operating system is a Linux host operating system. In an alternate embodiment, the determination module 305 queries the host computer 110 for the host operating system information. In a certain embodiment, the determination module 305 queries a configuration file such as a network configuration file for the host operating system information.

The characterization module 310 characterizes the host type of a logical volume 205 through a read-only examination of the logical volume. Thus the characterization module does not alter or modify the data stored in the logical volume 205 to characterize the host type. In one embodiment, the characterization module 310 characterizes the host type by reading and identifying the characteristic specifications of metadata of the logical volume 205. Metadata as used herein refers to data containing descriptors, identifiers, and other information about data stored on the storage device 125 that demark physical areas as logical volumes 205 and portions of logical volumes 205. For example, metadata may be used to demark host operating system partitions, file systems, directories, files, records, and the like of the logical volume 205. The characterization module 310 may characterize the host type by the location, composition, and values of the metadata.

In one embodiment, the apparatus 300 includes a host type record 325. The host type record 325 is configured with a plurality of host types each associated with at least one host operating system and including one or more host operating system characteristic specifications. For example, the characteristic specifications of the host type record 325 may describe the location, composition, and values of the metadata. The characterization module 310 may identify the host type of the logical volume 205 using the host type record 325.

The compatibility module 315 determines if the logical volume 205 is configured for the host operating system. In one embodiment, the compatibility module 315 identifies a compatible host operating system for a logical volume 205 host type from the host type record 325. For example, the host type record 325 may list a plurality of host operating systems that are compatible with the host type. The compatibility module 315 may determine that the logical volume 205 is configured for the host operating system if the host operating system is included in the list of host operating systems compatible with the host type of the logical volume 205.

The mitigation module 320 mitigates the mis-configuration if the logical volume 205 is not configured for the host operating system. In one embodiment, the mitigation module 320 notifies the user if the logical volume 205 is not configured for the host operating system. For example, the mitigation module 320 may display a warning message to the user's display and make an error log entry describing the mis-configuration. The apparatus 300 validates that the logical volume 205 is configured for the host operating system and mitigates mis-configurations.

Figure 4:
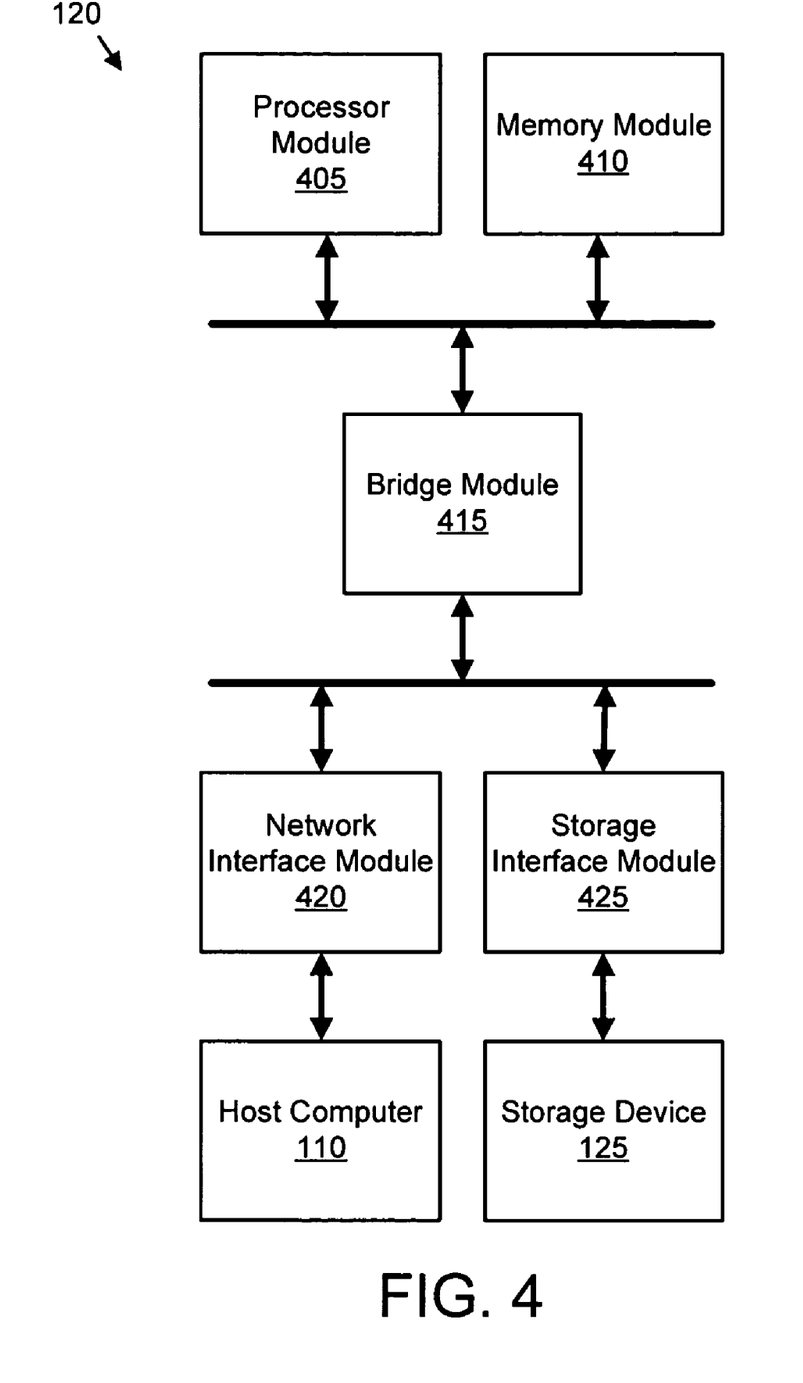
FIG. 4 is a schematic block diagram illustrating one embodiment of a controller module of the present invention.

FIG. 4 is a schematic block diagram of a controller module 120 of the present invention. The controller module 120 may be the controller module 120 depicted in FIGS. 1 and 2. In the depicted embodiment, the controller module 120 includes a processor module 405, a memory module 410, a bridge module 415, a network interface module 420, and a storage interface module 425. In addition, a host computer 110 and a storage device 125 in communication with the controller module 120 are depicted. In an alternate embodiment, the network interface module 420 and the storage interface module 425 are integrated in single module.

The processor module 405 executes one or more software programs residing in the memory module 410 as is well known by those skilled in the art. In one embodiment, the processor module 405 executes the determination module 305, the characterization module 310, the compatibility module 315, and the mitigation module 320 described in FIG. 3. In addition, the memory module 410 may store the host type record 325 described in FIG. 3.

The processor module 405 communicates with the network interface module 420, and the storage interface module 425 through a bridge module 415. In one embodiment, the bridge module 415 is an interface chipset. The network interface module 420 communicates with a network such as the network 115 depicted in FIG. 1. In one embodiment, the network interface module 420 is configured as Ethernet interface logic in a semiconductor device. In an alternate embodiment, the network interface module 420 is a network interface card. The determination module 305 may communicate through the network interface module 420 to identify the host operating system. In addition, the mitigation module 320 may communicate through the network interface module 420 to mitigate a mis-configuration between the host operating system and the logical volume 205, such as by notifying a user.

The storage interface module 425 communicates with the storage device 125. In one embodiment, the storage interface module 425 is configured as Fibre Channel interface logic in a semiconductor device. The characterization module 310 may communicate through the storage interface module 425 to characterize the host type of a logical volume 205 of the storage device 125.

Figure 5:
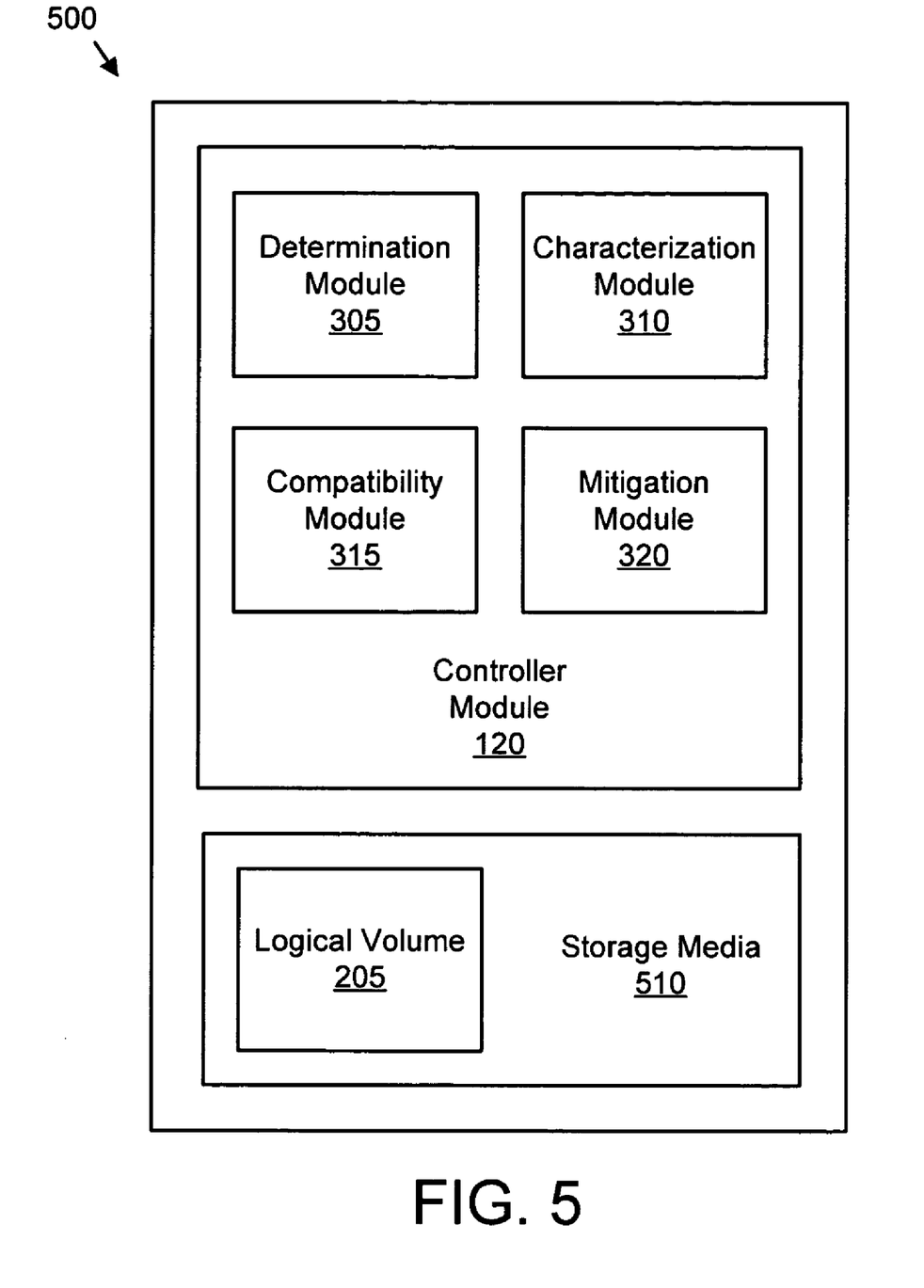
FIG. 5 is a schematic block diagram illustrating one embodiment of a validating storage system of the present invention.

FIG. 5 is a schematic block diagram of a validating storage system 500 in accordance with the present invention. The validating storage system 500 may include a storage device 125 as depicted in FIGS. 1 and 2 and validates a logical volume 205 configuration independently of the controller module 120. In one embodiment, the storage system 500 is a RAID array in communication with a network. The system 500 stores and retrieves data for one or more host computers 110 on a storage media 510 as directed by a controller module 120.

The determination module 305 determines the host operating system of a host computer 110 requesting access to a logical volume 205 of the storage media 510. The characterization module 310 characterizes the host type of the logical volume 205. In one embodiment, the characterization module 310 stores the host type when the logical volume 205 is configured. The compatibility module 315 determines if the logical volume 205 is configured for the host operating system. The mitigation module 320 mitigates the mis-configuration if the logical volume 205 is not configured for the host operating system. The system 500 validates the configuration of the logical volume 205 independently of a controller module 120.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 6:
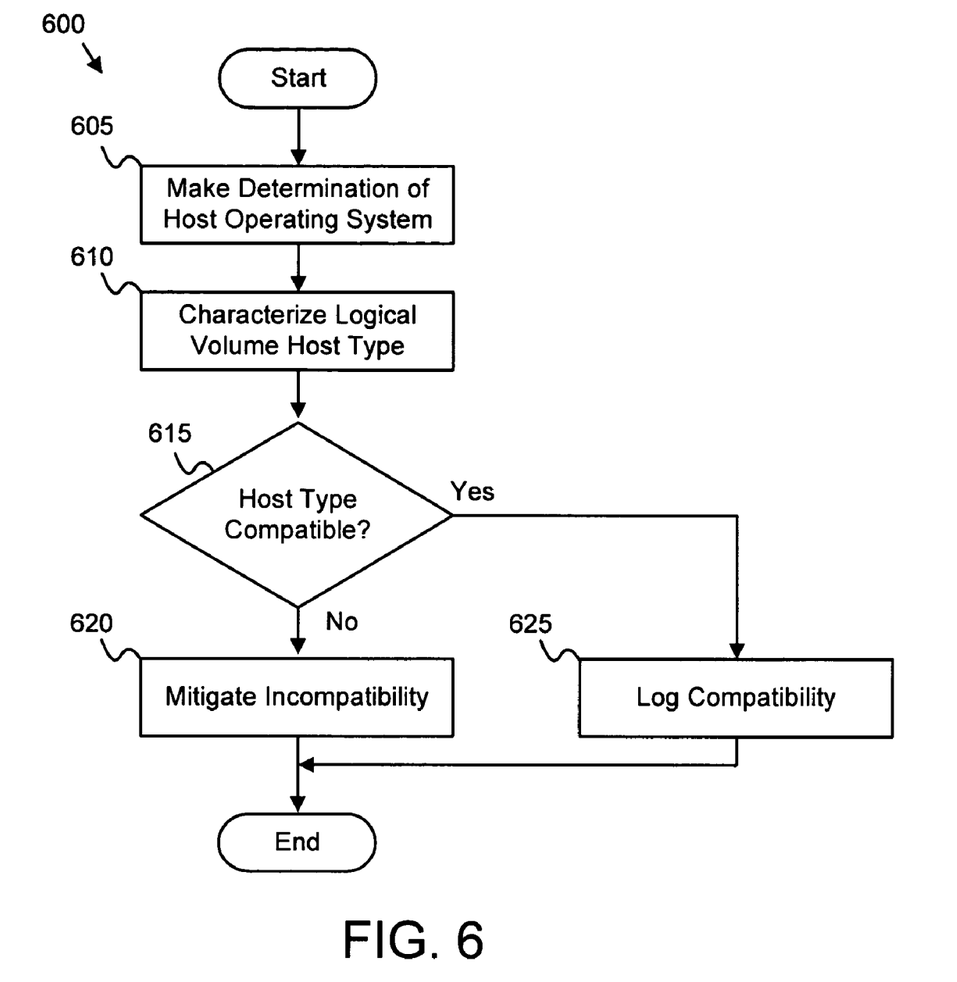
FIG. 6 is a schematic flow chart diagram illustrating one embodiment of a validation method in accordance with the present invention.

FIG. 6 is a schematic flow chart diagram illustrating one embodiment of a validation method 600 of the present invention. A determination module 305 makes a determination 605 a host operating system of a host computer 110. In one embodiment, the determination module 305 receives the determination of the host operating system from a user. For example, the user may specify the host operating system when directing the storage subsystem 130 to associate a logical volume 205 to a host computer 110.

In an alternate embodiment, the determination module 305 executes a function call that queries the host operating system of the host computer 110. In a certain embodiment, the determination module 305 queries a network operating system configuration file for the host operating system. For example, a network operating system may maintain configuration information for each host computer 110 controlled by the network operating system. The network operating system may respond to the determination module's 305 query with the host computer's 110 host operating system information.

A characterization module 310 characterizes 610 the host type of a logical volume 205. In one embodiment, the characterization module 310 reads metadata from the logical volume 205. The characterization module 310 may further compare the metadata locations, compositions, and values to a characteristic specification in an array of characteristic specifications recorded in a host type record 325. In a certain embodiment, each characteristic specification comprises metadata locations, compositions, and values.

The characterization module 310 may determine that the metadata read from the logical volume 205 is equivalent to a characterization specification and characterize 610 the host type of the logical volume 205 as the host type associated with the characterization specification in the host type record 325. In an alternate embodiment, the characterization module 310 characterizes 610 the host type as a member of a group of host types. Each member of the group of host types may be compatible with one or more host operating systems. For example, the host type may indicate that the logical volume 205 includes one or more characteristics such as metadata and the like common to the group of host types such that the logical volume 205 is configured for the host operating system of the group of host types.

In one embodiment, the characterization module 310 characterizes 510 the host type of the logical volume 205 as unknown if no host type in the host type record 325 is equivalent to the metadata locations, compositions, and values of the logical volume 205. In one embodiment, the characterization module 310 stores the host type of the logical volume 205. For example, the characterization module 310 may store the host type as part of the logical volume 205.

A compatibility module 315 determines 615 if the logical volume 205 is configured for the host operating system. In one embodiment, the compatibility module 315 references one or more host operating systems associated with the host type in the host type record 325 associated with the logical volume 205 and determines 615 that the logical volume 205 is configured for the host operating system if the host operating system is included in the referenced host operating systems of the host type record 325.

If the logical volume 205 is not configured for the host operating system, the mitigation module 320 mitigates 620 the mis-configuration. In one embodiment, the mitigation module 320 notifies the user. The mitigation module 320 may also notify the user of a host operating system that is compatible with the host type of the logical volume 205. In an alternate embodiment, the mitigation module 320 reconfigures the logical volume 205 such that the logical volume 205 is configured for the host operating system. For example, the mitigation module 320 may reconfigure the logical volume 205 as a Window' logical volume so that the logical volume 205 is configured for a Windows host operating system.

In a certain embodiment, the mitigation module 320 identifies an alternate logical volume 205 with a host type configured for the host operating system. For example, the mitigation module 320 may notify the user that a first logical volume 205a is not configured for the host operating system and suggest that the host computer 110 be associated with a second logical volume 205b, which has a host type configured for the host operating system.

In an alternate embodiment, the mitigation module 320 modifies a parameter regulating communications with the host operating system such that the host operating system may be compatible with the host type. Subsequent to mitigating 620 the mis-configuration, the mitigation module 320 terminates the method 600.

In one embodiment, if the host type is configured for the host operating system, the mitigation module 320 logs 625 the compatibility and the method 600 terminates. For example, the mitigation module 320 may record the compatibility in system log. The method 600 validates configuration of the logical volume 205 for the host operating system and mitigates mis-configuration between the host operating system and the logical volume 205.

Figure 7:
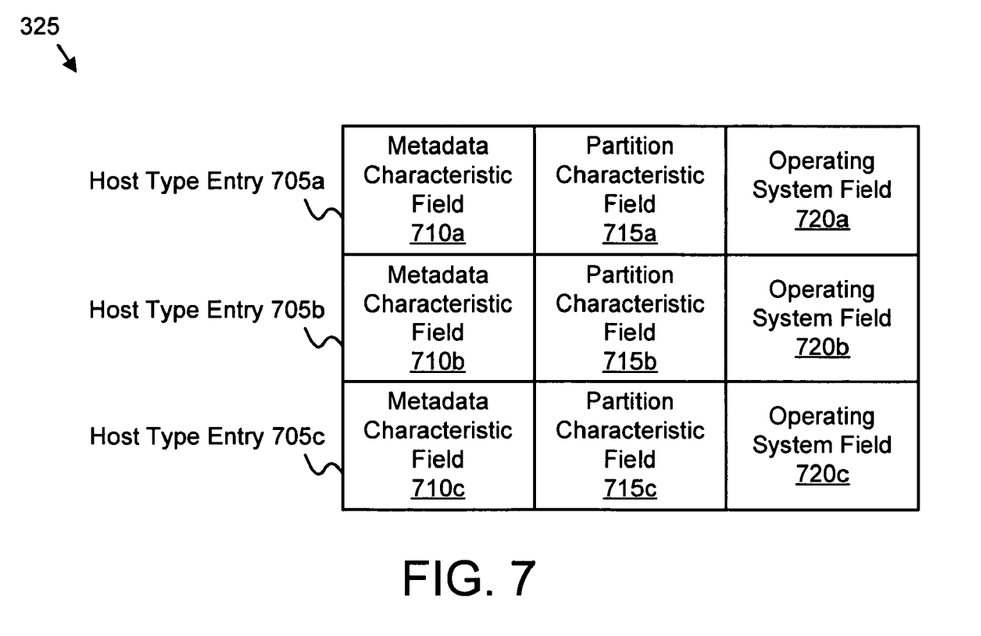
FIG. 7 is a schematic block diagram illustrating one embodiment of a host type record of the present invention.

FIG. 7 is a schematic block diagram of a host type record 325 of the present invention. The host type record 325 is organized as an array of host type entries 705. In one embodiment, the array of host type entries 705 is organized as a linked array. In an alternate embodiment, the array of host type entries 705 is organized as delimited flat file with each host type entry separated by a delimiter. Each depicted host type entry 705 includes a metadata characteristic field 710, a partition characteristic field 715, and an operating system field 720. In a certain embodiment, the metadata characteristic field 710 and the partition characteristic field 715 are configured as characteristic specifications. Although the depicted host type entries 705 include one metadata characteristic field 710, one partition characteristic field 715, and one operating system field 720, any number and type of fields may be included.

In one embodiment, the characterization module 310 references each host type entry 705, comparing the metadata characteristic specifications of a logical volume 205 with the metadata characteristic specifications in each metadata characteristic field 710 and comparing the partition characteristics of the logical volume 205 with partition characteristics described in each partition characteristics field 715. If the metadata characteristic specifications and partition characteristics are equivalent for a given host type entry 705, the characterization module 310 characterizes 610 the host type of the logical volume 205 as the host type of the host type entry 705. In addition, the compatibility module 315 may reference the operating systems listed in the operating system field 720 to determine 615 if a host operating system is compatible with the host type of the logical volume 205.

The present invention is the first to validate that a logical volume 205 of a storage device 125 is configured for a host operating system by characterizing 610 the host type of the logical volume 205 and determining if the logical volume 205 is configured for the host operating system. In addition, the present invention mitigates 620 the mis-configuration if the logical volume 205 is not configured for the host operating system. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to validate configuration, the apparatus comprising:
   a determination module comprising executable code stored on a semiconductor device, executed by a processor, and configured to make a determination of a type of a host operating system of a host computer by querying the host computer;
   a characterization module comprising executable code stored on the semiconductor device, executed by the processor, and configured to characterize a host type of a logical volume through a read-only examination of the characteristic specifications of metadata of the logical volume, the host type comprising metadata characteristics, partition characteristics, and compatible operating systems;
   a compatibility module comprising executable code stored on the semiconductor device, executed by the processor, and configured to determine if the logical volume is configured for the determined type of host operating system; and
   a mitigation module comprising executable code stored on the semiconductor device, executed by the processor, and configured to mitigate the mis-configuration if the logical volume is not configured for the host operating system.

2. The apparatus of claim 1, wherein the mitigation module is further configured to notify a user if the logical volume is not configured for the host operating system.

3. The apparatus of claim 1, wherein the mitigation module is further configured to reconfigure the logical volume such that the logical volume is configured for the host operating system if the host type is incompatible with the host operating system.

4. The apparatus of claim 1, wherein the mitigation module is further configured to identify a host operating system compatible with the logical volume if the logical volume is incompatible with the host operating system.

5. The apparatus of claim 1, wherein the characterization module is configured to characterize the host type as a member of a group of host types.

6. The apparatus of claim 1, further comprising a host type record comprising executable code stored on the semiconductor device, executed by the processor, and configured with a plurality of host types each associated with at least one host operating system and comprising at least one host operating system characteristic specification.

7. The apparatus of claim 6, wherein the configuration module is further configured to characterize the host type as unknown if the host type is not equivalent to a host type of the host type record.

8. A system capable of validating configuration of a logical volume, the system comprising:
   a host computer;
   a storage subsystem comprising:
   a storage device configured with a logical volume; and
   a controller module in communication with the host computer and the storage device, configured to control the storage device, the controller module comprising:
   a determination module comprising executable code stored on a semiconductor device, executed by a processor, and configured to make a determination of a type of a host operating system of the host computer by querying the host computer;
   a characterization module comprising executable code stored on the semiconductor device, executed by the processor, and configured to characterize a host type of the logical volume through a read-only examination of the characteristic specifications of metadata of the logical volume, the host type comprising metadata characteristics, partition characteristics, and compatible operating systems;
   a compatibility module comprising executable code stored on the semiconductor device, executed by the processor, and configured to determine if the logical volume is configured for the determined type of host operating system; and
   a mitigation module comprising executable code stored on the semiconductor device, executed by the processor, and configured to mitigate the mis-configuration if the logical volume is not configured for the host operating system.

9. The system of claim 8, wherein the storage subsystem is configured as a storage area network configured with a plurality of storage devices.

10. The system of claim 8, wherein the mitigation module is further configured to direct the characterization module to characterize the host type of a plurality of logical volumes and the comparison module to determine if the host type of each logical volume is configured for the host operating system, and wherein the mitigation module associates a compatible logical volume with the host computer.

11. The system of claim 8, wherein the controller module is configured to direct the determination module, the characterization module, the compatibility module, and the mitigation module to validate the configuration of the logical volume for the host operating system responsive to a user command.

12. The system of claim 8, wherein the mitigation module is further configured to notify a user if the logical volume is not configured for the host operating system.

13. The system of claim 8, wherein the mitigation module is further configured to reconfigure the logical volume such that the logical volume is compatible with the host operating system if the logical volume is incompatible with the host operating system.

14. A program of executable code stored on a semiconductor device and executed by a processor to perform operations to validate configuration, the operations comprising:

making a determination of a type of a host operating system of a host computer by querying the host computer;

characterizing the host type of a logical volume through a read-only examination of the characteristic specifications of metadata of the logical volume, the host type comprising metadata characteristics, partition characteristics, and compatible operating systems;

determining if the logical volume is configured for the determined type of host operating system; and     mitigating the mis-configuration if the logical volume is not configured for the host operating system.

15. The program of claim 14, further comprising operations to notify a user to mitigate the mis-configuration if the logical volume is not configured for the host operating system.

16. The program of claim 14, further comprising operations to reconfigure the logical volume such that the logical volume is compatible with the host operating system if the logical volume is not configured for the host operating system.

17. A method for validating compatibility, the method comprising:

making a determination of a type of a host operating system of a host computer by querying the host computer;

characterizing a host type of a logical volume through a read-only examination of the characteristic specifications of metadata of the logical volume, the host type comprising metadata characteristics, partition characteristics, and compatible operating systems;

determining if the logical volume is configured for the determined host operating system; and     mitigating the mis-configuration if the logical volume is not configured for the host operating system.

18. The method of claim 17, further comprising notifying a user to mitigate the mis-configuration if the logical volume is not configured for the host operating system.

19. The method of claim 17, further comprising reconfiguring the logical volume such that the logical volume is compatible with the host operating system if the logical volume is not configured for the host operating system.

\* \* \* \* \*